US012257509B2

(12) United States Patent
Benzies (10) Patent No.: US 12,257,509 B2
(45) Date of Patent: Mar. 25, 2025

(54) MULTI-PLAYER GAME

(71) Applicant: Build a Rocket Boy Games Ltd., Edinburgh (GB)

(72) Inventor: Leslie Peter Benzies, Edinburgh (GB)

(73) Assignee: Build a Rocket Boy Games Ltd., Edinburgh (GB)

( * ) Notice: Subject to any disclaimer, the term of this patent is extended or adjusted under 35 U.S.C. 154(b) by 252 days.

(21) Appl. No.: 17/619,138

(22) PCT Filed: Jun. 18, 2020

(86) PCT No.: PCT/EP2020/067033
§ 371 (c)(1),
(2) Date: Dec. 14, 2021

(87) PCT Pub. No.: WO2020/254532
PCT Pub. Date: Dec. 24, 2020

(65) Prior Publication Data
US 2022/0305389 A1    Sep. 29, 2022

(30) Foreign Application Priority Data
Jun. 20, 2019  (GB) ...................................... 1908874

(51) Int. Cl.
*A63F 13/69* (2014.01)
*A63F 13/46* (2014.01)
(Continued)

(52) U.S. Cl.
CPC .............. *A63F 13/69* (2014.09); *A63F 13/46* (2014.09); *A63F 13/47* (2014.09); *A63F 13/52* (2014.09)

(58) Field of Classification Search
CPC ........ A63F 13/424; A63F 13/46; A63F 13/47; A63F 13/52; A63F 13/69; A63F 2300/6018
See application file for complete search history.

(56) References Cited

U.S. PATENT DOCUMENTS 5,513,129 A * 4/1996 Bolas ...................... G06F 3/011
703/13
5,915,972 A * 6/1999 Tada ...................... G10H 1/368
386/230
(Continued)

FOREIGN PATENT DOCUMENTS

CA           2725722 A1 *  6/2012  ............. A63F 13/10

OTHER PUBLICATIONS

Written Opinion issued in PCT/EP2020/67033 on Sep. 11, 2020.
(Continued)

*Primary Examiner* — Steven J Hylinski
(74) *Attorney, Agent, or Firm* — SoCal IP Law Group LLP; Jonathan Pearce (57) ABSTRACT

A method comprising: providing a three dimensional computer generated environment for a multi-player combat video game; providing a controllable character for each player of the multi-player combat video game to control in the three dimensional computer generated environment; selecting one of a plurality of stored pieces of music, wherein each stored piece of music has pre-determined timing data representative of a time of one or more changes in at least one characteristic of the stored piece of music; providing said selected piece of music to each player of the multi-player game as the players play the multi-player combat video game; modifying one or more aspects of the multi-player combat video game in response to the one or more changes in at least one characteristic of the provided piece of music, wherein the one or more aspects of the multi-player combat video game comprises at least one of: a) a scoring system; b) one or more properties or elements of the virtual environment thereby to change an accessible area of the environment; c) an environmental condition of the three dimensional computer generated environment.

24 Claims, 5 Drawing Sheets

(51) Int. Cl.
*A63F 13/47* (2014.01)
*A63F 13/52* (2014.01)

(56) References Cited

U.S. PATENT DOCUMENTS

| | | | | | |
|---|---|---|---|---|---|
| 6,137,042 | A | * | 10/2000 | Kurtzberg | G09B 15/00 |
| | | | | | 84/672 |
| 6,352,432 | B1 | * | 3/2002 | Tsai | G10H 1/368 |
| | | | | | 84/610 |
| 6,369,822 | B1 | * | 4/2002 | Peevers | G06T 13/205 |
| | | | | | 704/E21.02 |
| 6,572,475 | B1 | * | 6/2003 | Okabe | A63F 13/69 |
| | | | | | 463/30 |
| 6,582,309 | B2 | * | 6/2003 | Higurashi | A63F 13/5375 |
| | | | | | 463/31 |
| 6,898,759 | B1 | * | 5/2005 | Terada | G10H 1/368 |
| | | | | | 345/473 |
| 7,208,669 | B2 | * | 4/2007 | Wells | A63F 13/30 |
| | | | | | 84/464 R |
| 7,339,589 | B2 | * | 3/2008 | Annunziata | A63F 13/45 |
| | | | | | 345/473 |
| 7,589,727 | B2 | * | 9/2009 | Haeker | G10H 1/0066 |
| | | | | | 345/440 |
| 9,286,383 | B1 | | 3/2016 | Robinson | |
| 2005/0045025 | A1 | | 3/2005 | Wells et al. | |
| 2007/0265097 | A1 | | 11/2007 | Havukainen | |
| 2010/0009750 | A1 | | 1/2010 | Egozy et al. | |
| 2013/0237321 | A1 | | 9/2013 | Annunziata | |
| 2016/0332074 | A1 | * | 11/2016 | Marr | A63F 13/55 |

OTHER PUBLICATIONS

European Union Intellectual Property Office, European Examination Report for European Patent Application No. 20733975.5, mail date Jan. 22, 2024, 4 total pages.

* cited by examiner

MULTI-PLAYER GAME

CROSS-REFERENCE TO RELATED APPLICATIONS

This application is a national stage application of PCT/EP2020/067033, filed on Jun. 18, 2020, entitled "MULTI-PLAYER GAME," which claims priority to UK Application No. 1908874.9, filed on Jun. 20, 2019, both of which are hereby incorporated by reference in their entirety for all purposes.

FIELD

The present invention relates to a system and method for providing a multi-player video game, for example a video game system or method.

BACKGROUND

In multi-player shooter-type games, players combat each other using weapons, for example, weapons capable of firing projectiles. The purpose of such games may vary, but typically a player obtains points for killing or hurting opponents while avoiding being killed or hurt themselves. Players may also be awarded points for completing certain tasks.

Multi-player shooter-type video games include first person and third person perspective games. In a first person perspective game, players of the game observe and navigate a three dimensional computer generated environment from the perspective of a character in the environment. In a third person perspective game players of the game view their character in the three dimensional computer generated environment. In multi-player shooter-type games, it is known to play a piece of accompanying music during gameplay.

U.S. Pat. No. 9,704,350 B1 describes providing, using a game console, a combat video game that includes a weapon and providing, using the game console and an audiovisual system, music as the player plays the video game and analyzing, using the game console, at least one of (i) the music and (ii) metadata relating to the music, to determine a timing parameter related to the music, and cause the on-screen character to fire projectiles from the weapon wherein firing the projectiles comprises varying a parameter of the projectiles fired from the weapon as a function of the timing parameter.

SUMMARY

In accordance with a first aspect of the invention, there is provided a method comprising:
- providing a three dimensional computer generated environment for a multi-player combat video game;
- providing a controllable character for each player of the multi-player combat video game to control in the three dimensional computer generated environment;
- selecting one of a plurality of stored pieces of music, wherein each stored piece of music has pre-determined timing data representative of a time of one or more changes in at least one characteristic of the stored piece of music;
- providing said selected piece of music to each player of the multi-player game as the players play the multi-player combat video game;
- modifying one or more aspects of the multi-player combat video game in response to the one or more changes in at least one characteristic of the provided piece of music.

The one or more aspects of the multi-player combat video game may comprise a scoring system. The one or more aspects of the multi-player combat video game may comprise one or more properties or elements of the virtual environment thereby to change an accessible area of the environment. The one or more aspects of the multi-player combat video game may comprise an environmental condition of the three dimensional computer generated environment.

The timing data may comprise one or more timing parameters, wherein each timing parameter or value of each timing parameter corresponds to the time of a change in at least one characteristic of the provided piece of music. The method further comprises obtaining elapsed time data representative of an elapsed time of the provided song and processing the timing data and the elapsed time data to compare the elapsed time with the one or more timing parameters of the timing data.

Modifying the one or more aspects of the multi-player combat video game may be performed in response to the elapsed time substantially coinciding to the time of a change in at least one characteristic of the provided piece of music.

The one or more changes in the at least one characteristic of the provided piece of music may comprise a transition from a first section of the piece of music to a second section of the provided piece of music. The one or more changes in the at least one characteristic of the provided piece of music may comprise a change in one or more of: a tempo, a pitch, a loudness, a musical key of the provided piece of music. The one or more changes in the at least one characteristic of the provided piece of music may comprise a pre-determined chord progression, lyric, musical phrase and/or riff of the provided piece of music.

The one or more aspects of the multi-player combat video game may be modified to encourage a behavioural response from one or more players of the multi-player combat video game. The one or more aspects of the multi-player combat video game may be modified to encourage combat between players of the multi-player combat video game. The one or more aspects of the multi-player combat video game may be modified to provide a relative advantage and/or disadvantage to one or more players in the combat video game.

A first modification may be applied to an aspect of the multi-player combat video game for a first set of one or more players of the multi-player combat video game and a second, different modification, may be applied to the aspect of the multi-player combat video game or to a further aspect of the multi-player combat video game for a second set of one or more players.

The one or more aspects of the multi-player combat video game may be modified in accordance with a pre-determined set of rules associated with the selected pieced of music.

The pre-determined rules may comprise a pre-determined set of modifications to one or more aspects of the multi-player combat video game that correspond to one or more changes in at least one characteristic of the provided piece of music, such that, over more than one gameplay session with a particular selected piece of music, the same modifications are performed in response to the same changes in the at least one characteristic of the particular selected piece of music.

The modification to one or more aspects of the multi-player combat video game may be applied for a time period.

The modification to one or more aspects of the multi-player combat video game may be applied until a further change in the at least one characteristic of the provided piece of music. The modification to one or more aspects of the multi-player combat video game may be applied until a reversal of the change in the at least one characteristic of the provided piece of music.

The one or more aspects of the multi-player combat video game to be modified may be selected during the game based on at least one of: the performance of one or more players in the game session or over one or more game sessions, relative performance of players in the game session or over one or more game sessions, time elapsed.

Modifying the one or more aspects of the multi-player combat video game may comprise increasing or decreasing points available to the players during gameplay. Modifying the one or more aspects of the multi-player combat video game may comprise providing score multipliers during gameplay. Modifying the one or more aspects of the multi-player combat video game may comprise increasing and/or decreasing availability and/or the benefit of items available to players in the three dimensional computer generated environment. Modifying the one or more aspects of the multi-player combat video game may comprise providing items at one or more pre-determined locations in the three dimensional computer generated environment.

Modifying the one or more aspects of the multi-player combat video game may comprise changing the accessible area of the three dimensional environment to be smaller and/or to be restricted and/or to be limited to a particular region of the three dimensional environment. Modifying the one or more aspects of the multi-player combat video game may comprise changing the accessible area of the three dimensional environment to be larger and/or to be less restricted and/or to be less limited to a particular region of the three dimensional environment.

Modifying one or more aspects of the multi-player combat video game may comprise one or more of: opening and/or closing doors, moving one or more structural elements.

Modifying one or more aspects of the combat video game may comprise changing at least one of:
a) a visual aspect of the three dimensional computer generated environment;
b) a parameter of the physics engine;
c) providing access for players to a further three dimensional computer generated environment.

Changing an environment condition of the three dimensional computer generated environment may comprise triggering an environmental event that provides at least one change in an aspect of the three dimensional computer generated environment. The environmental event comprises a weather event, a volcano, an earthquake.

Modifying one or more aspects of the multi-player combat video game may comprise at least one of:
a) adding further players to the combat video game;
b) removing players from the combat video game;
c) substituting players of the combat video game;
d) mixing players between teams of the combat video game;
e) swapping location of players of the combat video game.

Adding, removing, substituting and/or swapping of players may be performed based on the performance of one or more players in the game session and/or historical performance over one or more game sessions, relative performance of players in the game session or over one or more game sessions.

Modifying one or more aspects of the multi-player combat video game may comprise changing the location of one or more players to be in a pre-defined region of the three dimensional computer generated environment.

The multi-player combat video game may be played over a network of computer resources. The method may further comprise performing a synchronisation process across the computer resources of the network such that each player experiences the one or more changes in the at least once characteristic of the provided piece of music at the substantially the same time.

The synchronisation process may comprise compensating for one or more changes in: network speed, network latency, network signalling delays, network lag.

Selecting the piece of music may be performed by one or more players of the combat video game.

The method may further comprise selecting the piece of music based on a voting process performed by players of the multi-player video combat game. The method may further comprise analysing player performance and selecting the piece of music based on said analysed player performance. The method may further comprise selecting one of a plurality of three dimensional computer generated environments in which to play the combat video game and each of the plurality of three dimensional computer generated environments has a corresponding piece of music.

In accordance with a second aspect of the present invention, there is provided a computer apparatus comprising a processor configured to:
provide a three dimensional computer generated environment for a multi-player combat video game;
provide a controllable character for each player of the multi-player combat video game to control in the three dimensional computer generated environment;
select one of a plurality of stored pieces of music stored in a memory resource, wherein each stored piece of music has pre-determined timing data representative of a time of one or more changes in at least one characteristic of the stored piece of music;
provide said selected piece of music to each player of the multi-player game as the players play the multi-player combat video game;
modify one or more aspects of the multi-player combat video game in response to the one or more changes in at least one characteristic of the provided piece of music, wherein the one or more aspects of the multi-player combat video game comprises at least one of:
a) a scoring system;
b) one or more properties or elements of the virtual environment thereby to change an accessible area of the environment;
c) an environmental condition of the three dimensional computer generated environment.

The memory resource may store the music and/or timing data.

The memory resource may be provided as part of the computer apparatus and/or as part of a further computer apparatus.

In accordance with a third aspect of the invention, there is provided a system comprising a plurality of computer apparatuses connected to a further computing resource, wherein the system comprises at least one processor and at least one memory resource, wherein the at least one processor is configured to:
provide a three dimensional computer generated environment for a multi-player combat video game;

provide a controllable character for each player of the multi-player combat video game to control in the three dimensional computer generated environment;

select one of a plurality of stored pieces of music from the memory resource, wherein each stored piece of music has pre-determined timing data representative of a time of one or more changes in at least one characteristic of the stored piece of music;

provide said selected piece of music to each player of the multi-player game as the players play the multi-player combat video game;

modify one or more aspects of the multi-player combat video game in response to the one or more changes in at least one characteristic of the provided piece of music, wherein the one or more aspects of the multi-player combat video game comprises at least one of:

a) a scoring system;

b) one or more properties or elements of the virtual environment thereby to change an accessible area of the environment;

c) an environmental condition of the three dimensional computer generated environment.

There may be provided a method or system substantially as described herein with reference to the accompanying drawings.

Features in one aspect may be provided as features in any other aspect as appropriate. For example, features of a method may be provided as features of an apparatus and/or system and vice versa. Any feature or features in one aspect may be provided in combination with any suitable feature or features in any other aspect.

BRIEF DESCRIPTION OF THE DRAWINGS

Embodiments of the invention are now described, by way of non-limiting example, and are illustrated in the following figures, in which.

DETAILED DESCRIPTION

The described embodiments relate to providing a three dimensional environment computer generated environment and controllable characters for a multi-player combat video game and playing a piece of music during the gaming session. The described embodiments relate to using music to control and/or otherwise modify the behaviour of players in a multi-player combat video game. The control of behaviour is performed through modification of one or more aspects of the multi-player combat video game at certain times or events during the piece of music. The modifications are made in response to changes in one or more characteristics of the piece of music. The modification of the one or more aspects of the multi-player game may encourage a behavioural response from the players of the game.

The described embodiments relate to multi-player deathmatch genre games. Typically, the aim of the multi-player combat game is to kill (or "frag") as many other players as possible during a game session. In the present embodiment, one or more pieces of music are played to accompany the game session and modifications to the game are intended to modify behaviour of players. Death-match type games take place in a game environment and players are provided with items, for example, weapons, health, armour.

As a first non-limiting example, in some embodiments, the game session may be controlled to induce or encourage combat at certain times of a game session and/or at certain areas of the computer-generated environment. As a second non-limiting example, the game session may be controlled to provide relative benefits or advantages to one or more players of the combat game.

Figure 1:
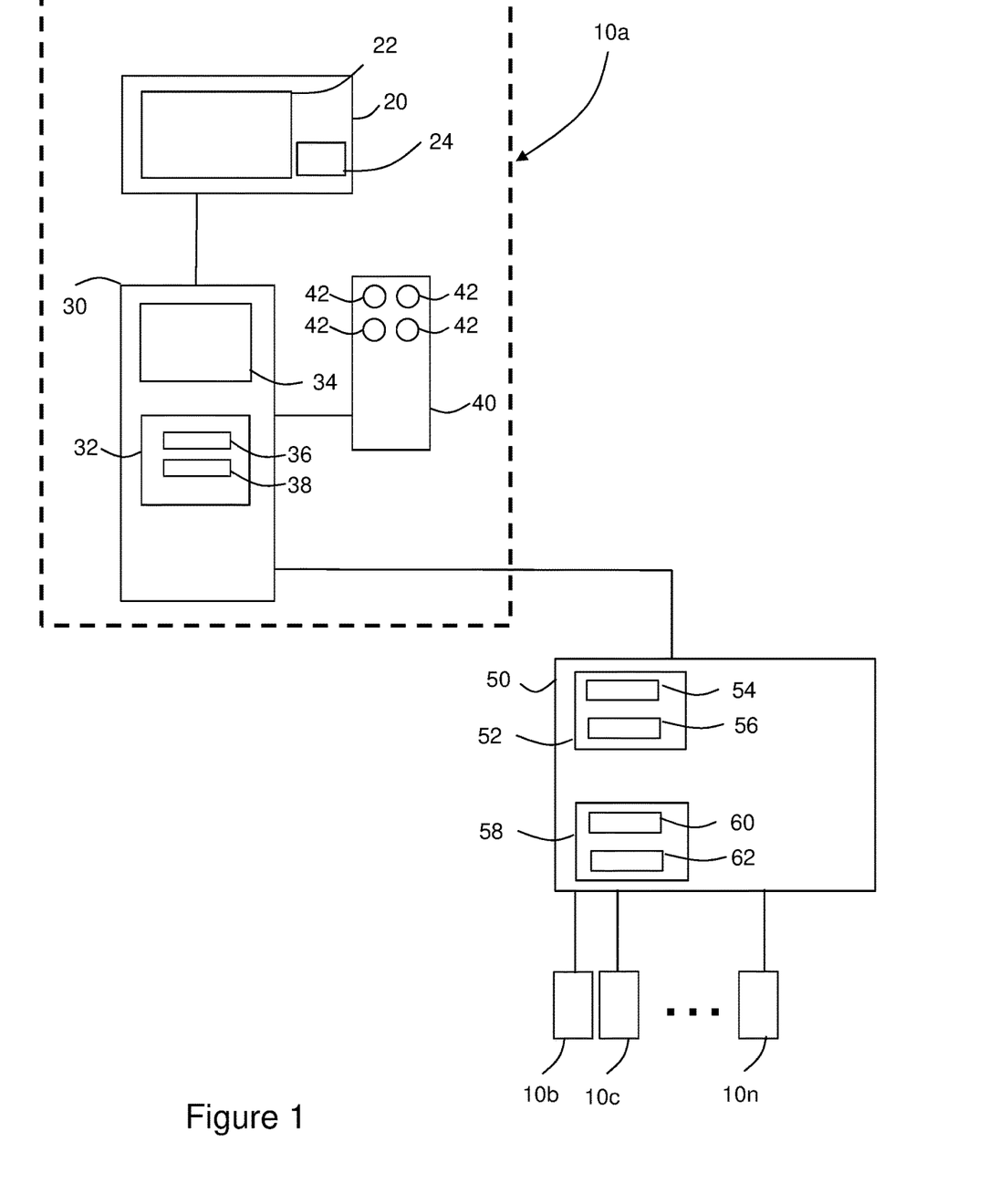
FIG. 1 is a schematic illustration of a system including a video game apparatus in accordance with an embodiment.

FIG. 1 is a schematic illustration of a video game apparatus 10a in accordance with an embodiment. The video game apparatus 10a comprises a display apparatus 20, a computing apparatus 30 and a user input device 40. The computing apparatus 30 is connected to a further computing resource 50. The computing apparatus 30 may also be referred to as a computer apparatus or computing resource.

FIG. 1 shows a plurality of video game apparatuses 10a, 10b, 10c, . . . 10n connected to a further computing resource 50. Each video game apparatus of the plurality of video game apparatuses substantially corresponds to the video game apparatus 10a herein described. It will be understood that each video game apparatus 10b, 10c, . . . 10n also comprises a respective display apparatus and user input device, substantially as described with reference to the video game apparatus 10a of FIG. 1.

With reference to video game apparatus 10a, display apparatus 20 comprises a display 22 configured to display visual content to be viewed by a user. In this embodiment, the display apparatus 20 is a monitor. In other embodiments, the display apparatus 20 is a television or a smart television. In other embodiments, the display apparatus 20 is a smartphone or smart device and the display 22 is a screen forming part of said smartphone or smart device. In other embodiments, the display 22 is any screen suitable for displaying images or visual content.

In the present embodiment, display apparatus 20 has a speaker 24 for emitting audio including in-game audio effects and background music. Although in the present embodiment the speaker 24 is provided as part of the display apparatus 20, in some embodiments the speaker 24 is provided as part of a separate audio device. In other embodiments, the speaker 24 is part of a pair of headphones or headset.

Display apparatus 20 is connected to computing apparatus 30 by a video and audio interface. The interface may be configured to carry digital data and/or analogue data. It will be understood that any suitable video and audio interface can be used. Non-limiting examples include, for example, SCART, HDMI, VGA based interfaces, DVI based interfaces. In the present embodiment, the video and audio interface comprises a wired connection. In other embodiments, the video and audio interface comprise a wireless connection.

In some embodiments, uncompressed audio and video data are transmitted from the computing apparatus 30 to the display apparatus 20 over the video and audio interface. In some embodiments, at least one of the audio data and the video data transmitted from the computing apparatus 30 is compressed by compression circuitry provided as part of the computing apparatus 30 (not shown). In embodiments where compressed video and/or audio data are transmitted over the interface, the display apparatus 20 has further circuitry also referred to as compression circuitry (not shown) for uncompressing said compressed data to be displayed on display 22.

In the present embodiment, video game apparatus 10a may is a personal computer (PC). In other embodiments, video game apparatus 10a is any suitable computing apparatus or combination of computing apparatuses. In some embodiments, video game apparatus 10a is a video game console e.g. a computer apparatus configured for playing video games.

Processor 32 of computer apparatus 30 is configured to provide video data to the display apparatus 20, via the video interface, to be displayed on display 22. The processor 32 may also be referred to as a processing resource. The processor 32 is further configured to provide audio data, via the audio interface, to the display apparatus 20 to be broadcast by speaker 24. The processor 32 may also be referred to as a processing resource or a local processor.

In the present embodiment, the processor 32 is configured to provide video data to the display apparatus 20, as a live feed of images, for example a feed of images at least 45 frames a second.

The computing apparatus 30 has a memory 34 configured to store instructions, data and files needed for generating a computer-generated environment or part thereof.

The plurality of video game apparatuses 10a, 10b, 10c, . . . 10n are communicatively connected to the further computing resource 50. In the present embodiment, the further computing resource 50 comprises a video game server. The shared computing resource 50 may therefore be referred to as a video game server or, simply, as a game server.

The further computing resource 50 comprises shared resources that the plurality of computing apparatuses 10a, 10b, 10c, . . . 10n can use to provide the three dimensional computer generated environment to the respective users of the plurality of video game apparatuses 10a, 10b, 10c, . . . 10n.

The further computing resource 50 comprises a memory resource 52 and a processing resource 58. The memory resource 52 has a music store 54 and a timing data store 56. Processing resource 58 has dedicated circuitry including timing circuitry 60 for processing elapsed time data for a selected piece of music and timing data. Processing resource 58 also has modification circuitry 62 for modifying one or more aspects of the multi-player video game.

Timing data store 56 stores pre-determined timing data for corresponding pieces of music stored in music store 54. The timing data is representative of changes in characteristics of the pieces of music. Timing data store 56 therefore stores information relating to times during the pieces of music that modifications to the game are to be made.

The pre-determined timing data is generated before the game session is played. The timing data store 56 stores timing data corresponding to a number of pieces of music. The timing data is obtained separately. In some embodiments, the timing data is generated manually, at least in part.

For a particular characteristic of the piece music, the timing data represent changes in said characteristic. In some embodiments, the timing data represents the timing of changes in a plurality of different characteristics of the piece of music.

The characteristics of music, changes of which may be represented by the timing data, include tempo, pitch, loudness, musical key, transitions between musical elements, and musical phrases of the piece of music.

In accordance with embodiments, modification circuitry 62 is configured to make modifications to the game, for example, to the environment, to the character, to a scoring system, to the environment. The modification circuitry 62 thus operates together with the processor 32 of video game apparatus 10a and the processing resource 58 of video game server 50 to perform these modifications. In some embodiments, the modification circuitry 62 instructs the modifications based on output from the timing circuitry 60.

It will be understood that, in accordance with different embodiments, modifications to different aspects of the game are made. As described in further detail in the following, the modifications may relate to gameplay, for example, to a scoring system, or to properties or elements of the computer generated environment, for example, to change an accessible area of the environment and/or to change an environmental condition of the three dimensional computer generated environment.

In the following, when describing local processor 32 of video game apparatus 10a performing processing steps, for example, to generate the environment, character and/or game elements, it will be understood that, in some embodiments, processor 32 operates together with processor 58 of further computing resource 50 to generate the environment, character and/or game elements. It will also be understood that, in some embodiments, processing steps described as performed by processor 32 of video game apparatus 10a may be performed by processor 58 of further computing resource 50 and vice versa. In some embodiments, timing circuitry 60 and/or modification circuitry 62 and/or timing data store 56 and/or music store 54 are provided on one or more of the plurality of video game apparatuses 10a, 10b, 10c, . . . 10n.

The plurality of video game apparatuses can be connected to the video game server 50 over a wireless or wired connection, or over any suitable type of network, for example, the internet. In some embodiments, there no video game server and the plurality of video game apparatuses connect to each other via a network or a direct connection.

Game data is retrievable from the video game server 50. It will be understood that video game server 50 can be representative of more than one shared further computing resource or of a network of shared further computing resources.

In use, the plurality of video game apparatuses 10a, 10b, 10c, . . . 10n are connected to video game server 50 to commence a multi-player game session. Game data is retrieved from video game server 50 as required. As part of the game session, each player is provided with a controllable character in the generated environment. The multi-player game is such that each player can see and interact with the other players. A piece of music is played and the game session is started. In accordance with described embodiments, as the piece of music reaches certain times that coincide with changes in characteristics of the piece of music, one or more aspects of the game is modified. The behaviour of the player can thereby be controlled or changed using music.

In the present embodiment, turning to video game apparatus 10a, the processor 32 has dedicated processing circuitry, as described in the following. The processor 32 has graphics processing circuitry 36 configured to process and produce video data intended for display by the display apparatus 20. The graphics processing circuitry 36 may also be referred to as a graphics processing unit. The graphics processing circuitry 36 is configured for processing video data. The processor 32 also has audio processing circuitry 38 configured to process and produce audio data intended for broadcast by the speaker 24. The audio processing circuitry 38 is configured for processing audio data.

The processor 32 may comprise environment circuitry configured to generate a three-dimensional environment. The three-dimensional computer-generated environment may also be referred to as the environment or game world. The computer-generated environment may be representative of a real-world environment or may have elements that would be found in a real-world environment such that the computer-generated environment appears to be representative of a real-world environment. The computer-generated environment may be provided as part of a gaming session.

The environment circuitry is configured to generate at least one computer-generated exterior environment and/or at least one computer-generated interior environment.

The processor 32 may comprise object circuitry configured to generate one or more objects for the three dimensional environment. The computer-generated objects can include structural elements, for example, buildings, roads pavements, fields, bodies of water, trees. Structural elements are generally not moveable within the three dimensional environment, however, they can be interacted with.

The computer-generated objects also include objects, for example these objects may be representative street furniture, vehicles, walls, floors, ceilings, windows, furniture. Each object may be generated and/or modelled independently. In some embodiments, structural elements are modelled independently from objects.

The objects are represented in the computer generated environment in three dimensions. For example, objects may be first represented as polygonal meshes, which may also be referred to as a wire-frame representation. Objects may be represented as a combination of geometrical shapes. Objects may be represented as a combination of surfaces. Objects may be defined in a three-dimensional coordinate system of the computer-generated environment.

In some embodiments, the graphics processing unit 36 further comprises lighting circuitry configured to produce lighting effects and/or rendering circuitry configured for image rendering. Images of the three-dimensional computer-generated environment may be rendered as if viewed from a viewing position having a coordinate position that is inside the three-dimensional environment.

In some embodiments, the graphics processing unit 36 further comprises texture circuitry configured to apply textures to three dimensional models.

Objects within the environment may be rendered with any suitable image effects. For example, objects may be rendered as opaque or as at least partially transparent. Objects may be rendered with particular colours and/or textures (for example, using texture circuitry) which may or may not be realistic. Lighting effects may simulate lighting from light fixtures and/or external light, for example light arriving through windows. Any suitable lighting methods may be used, for example ray casting or global illumination. The lighting circuitry may simulate effects of reflection and/or refraction of light.

The processor 32 further comprises input circuitry configured to process inputs from the user input device 40 and/or from other input devices. The processor 32 further comprises character circuitry. The character circuitry is configured to generate a controllable character in the environment. The character circuitry and input circuitry are configured to receive user input user device 40 and to translate said user input into instructions for the character thereby to change the behaviour and/or control the character.

Computing apparatus 30 (for example, input circuitry of the processor 32) is configured to receive inputs from the user input device 40 and/or other input devices. Computing apparatus 30 (for example, graphic processing unit 36) is configured to provide images generated in dependence on the inputs from the user input device 40 and other input devices. Computing apparatus 30 (for example, character circuitry) is configured to move or modify behaviour of the character in dependence on the inputs from the user input device 40 and other input devices.

The computer-generated environment can be navigated by a user through a video game character. A user may be presented with a view including an on-screen character or a view corresponding to point of view of the character.

In some embodiments, the scene that is rendered includes a rendering of the character. The scene that is rendered is changed to reflect movement of the character. A scene rendered to include the character may also be referred to as third person perspective.

The character may be an avatar or other graphical representation of a person. In some embodiments, the character is a graphical representation of another object.

In some embodiments, no character is rendered and the scene provided corresponds to a view point of the character. The user navigates the scene by providing user input. The scene is updated to show a change in viewpoint. Rendered scenes that do not include a rendering of a character may be referred to a first person perspective.

In some embodiments, the user may be able to switch between first person perspective and third person perspective views.

In the following, it will be understood that any reference to movement or actions performed by a character in the three-dimensional environment refers to both scenes including a rendered character and scenes from a viewpoint of the character.

A user can control the character by operating user input device. In use, a user provides user input representative of an intended movement or other intended action, via the user input device 40. User input data is transmitted from the user input device 40 and received by processor 32 (for example by the input circuitry). The user input data is then processed by processor 32 and then translated into a set of instructions (for example, by character circuitry) for performing the intended movement or action. Performance of the intended movement or action include performing one or more rendering processing steps (for example, by graphics processing unit 36) in relation to the character and/or viewpoint and/or one or more objects that are being interacted with.

In some embodiments, the processor 32 may comprise camera circuitry for moving the viewpoint of the scene displayed to the user and hence updating the scene that is rendered.

In some embodiments, the camera circuitry may be configured to move the viewpoint independently of movement of the character in the environment. In some embodiments, the camera circuitry is configured to receive user input and change the viewpoint based on user input. In some embodiments, the camera circuitry is configured to automatically change the viewpoint based on movement or events happening in the computer-generated scene.

The graphics processing unit 36 is configured to produce a sequence of images in real time which provide the effect of the character being in the three-dimensional environment.

The images are rendered so as to provide a two-dimensional scene of the three-dimensional environment by providing input data to display apparatus 20 to be displayed on display 22. The images are rendered to give the impression to a user viewing the display 22 that they are viewing a character or the point of view of a character inside the three-dimensional environment.

The user may move the character or the viewpoint in the computer-generated scene by various means, for example by using the user input device 40 as described below.

The user may move the character and/or viewpoint in the coordinate space of the three-dimensional scene from a first viewing position to further viewing positions. As the user moves through the scene, the rendered images change in response to the change in viewing position within the scene. For example, a user may view the objects in the scene from different angles and/or distances.

In some embodiments, objects within the three-dimensional scene may be moveable based on received user input. Some objects may be manipulated by a user, for example, via the controllable character.

The processor 32 may comprise physics circuitry configured to simulate physical effects on objects, for example by making objects obey gravity. The physics circuitry may control interactions of objects with other objects, for example by causing an object to be stopped or deflected when it contacts another object, rather than passing through that object. In a games context, the provision of realistic physical interactions may be referred to as games physics. The physics circuitry may control interactions between the character and the objects. Physics of the game may be modified by changing values of one or more physics parameters used by the physics circuitry.

The processor 32 may comprise input circuitry configured to process inputs from the user input device 40 and/or from other input devices.

Computing apparatus 30 (for example, input circuitry of the processor 32) is configured to receive inputs from the user input device 40. Computing apparatus 30 (for example, the graphics processing unit 36) is configured to provide images generated in dependence on the inputs from the user input device 40. In further embodiments, computing apparatus 30 is configured to receive further inputs, and to provide images generated in dependence on those further inputs. For example, the computing apparatus 30 may further receive further inputs from at least one further input device (for example, a mouse, keyboard or trackball); from further sensors or other components; from a camera or other tracking device; and/or from at least one further computing apparatus.

Computing apparatus 30 also includes other components including RAM, ROM, a data bus, an operating system including various device drivers, and hardware devices including a graphics card. Such components are not shown in FIG. 1 for clarity.

User input device 40 is configured to be used by the user for inputting commands to computing apparatus 30. In the present embodiment, user input device 40 is a joypad comprising a plurality of buttons 42 that may be pressed by the user to provide input commands. In other embodiments, the user input device 40 may be any handheld device, for example a wand or games controller. In further embodiments, the user input device 40 may be any suitable input device, for example a keyboard, mouse or joystick.

In the present embodiment, user input device 40 is connected to computing apparatus 30 by a wireless connection.

In other embodiments, user input device 40 may be connected to computing apparatus 30 by any suitable wired or wireless connection.

In some embodiments, the user input device 40 is a hand-held device such as a games controller, wand, keyboard, or mouse or by detecting user gestures including body, head, hand movement In some embodiments, the video game server of further computing resource 50 hosts a user game account, which stores details of a user, for example, character data, game progress data, bank account and/or in-game currency data. The user game account is secured by a password and/or other security measures.

Although in the above described embodiments, component parts of system 10, for example, the display apparatus 20, the computer apparatus 30 and the user input device 40 are described as separate devices, in some embodiments, two or more of these component parts are provided as part of the same device.

Modification circuitry 62 of processor 58 is configured to instruct or otherwise operate together with the above-described dedicated circuitry and/or the processor of further computer resource and/or the processor 32 of the video game apparatus 10a to perform modifications to one or more aspects of the game. In some embodiments, the modification circuitry 62 instructs or otherwise operates together with input circuitry, physics circuitry, character circuitry, lighting circuitry, texture circuitry, rendering circuitry, object circuitry, environment circuitry, graphics processing circuitry to perform modifications to one or more aspects of the game.

In some embodiments, at least part of the dedicated circuitry described above is provided as part of the further computing resource 50 and the corresponding processing steps are performed at the further computing resource 50. In some embodiments, the modification circuitry 62 sends instructions to the processor 32 of video game apparatus 10a to modify one or more aspects of the game.

The system described with reference to FIG. 1 is configured to perform methods in accordance with the embodiments that are described in the following. In particular, the system is configured to perform the method described with reference to FIGS. 2 and 3.

Figure 2:
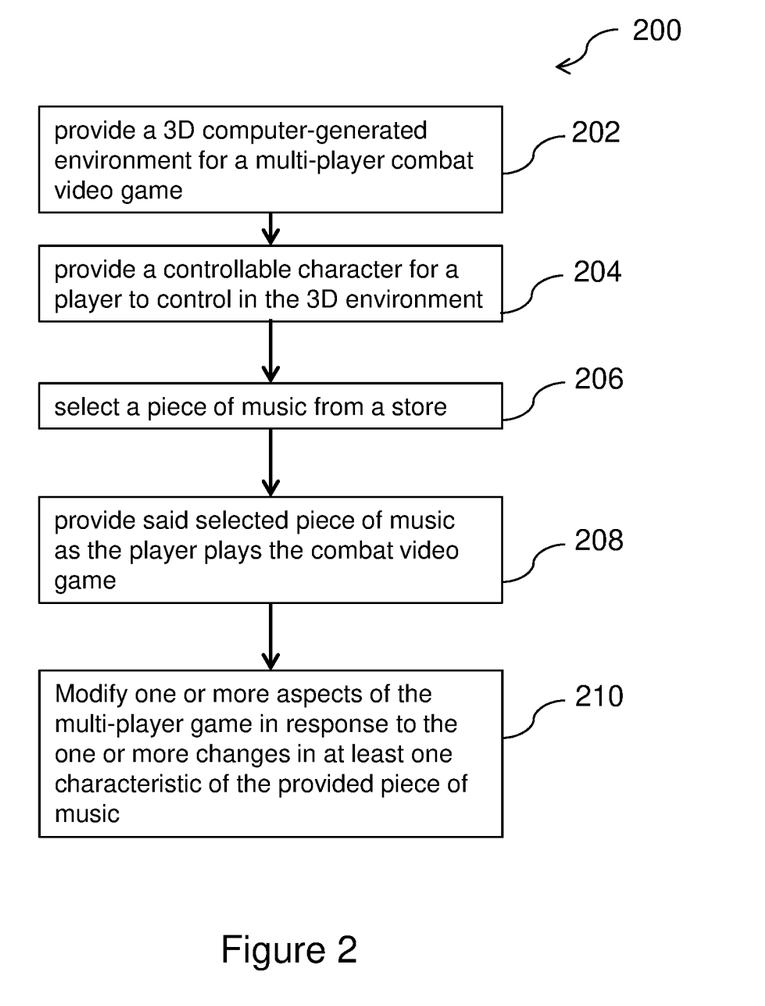
FIG. 2 is a flowchart illustrating in overview a method of an embodiment.

FIG. 2 illustrates a method 200 of providing a 3D multiplayer combat video game, in accordance with an embodiment.

Prior to step 202 of method 200, game data required is obtained from video game server 50 by the plurality of video game apparatuses 10a, 10b, 10c, . . . 10n.

Figure 4:
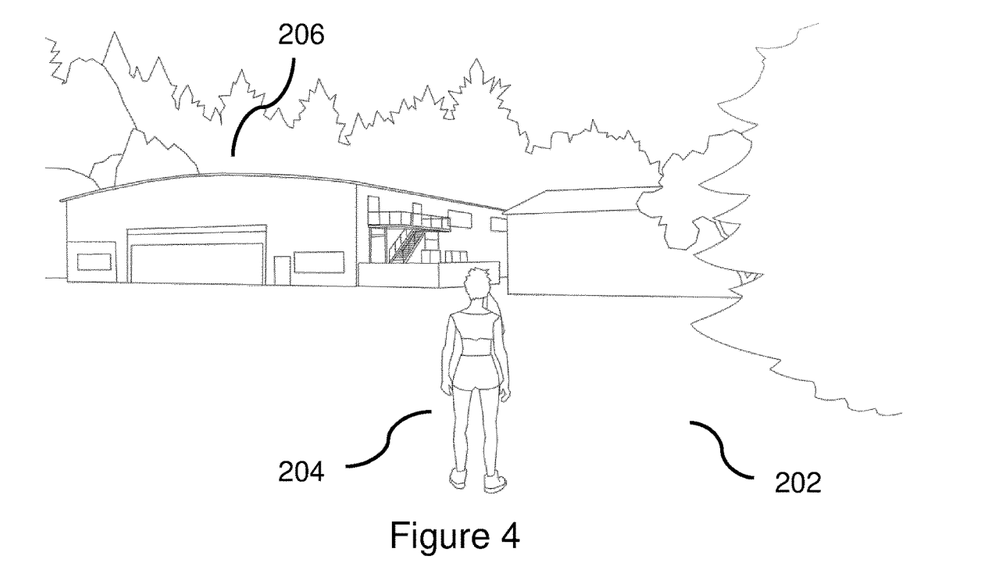
FIG. 4 is an illustration of a first screen shot representative of a computer generated environment.
Figure 5:
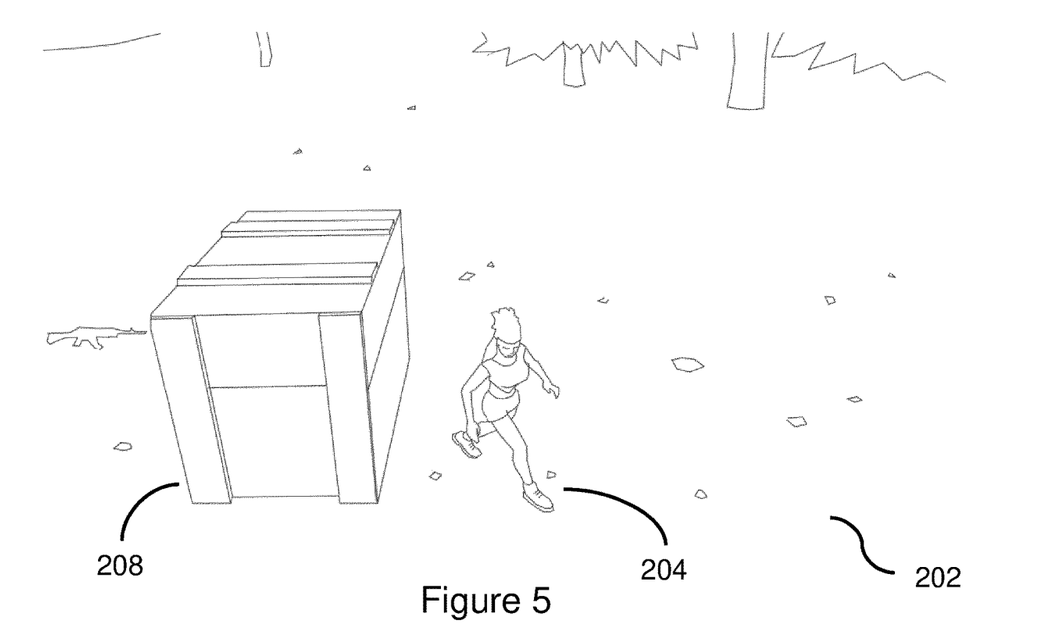
FIG. 5 is an illustration of a second screen shot representative of a computer generated environment.
Figure 6:
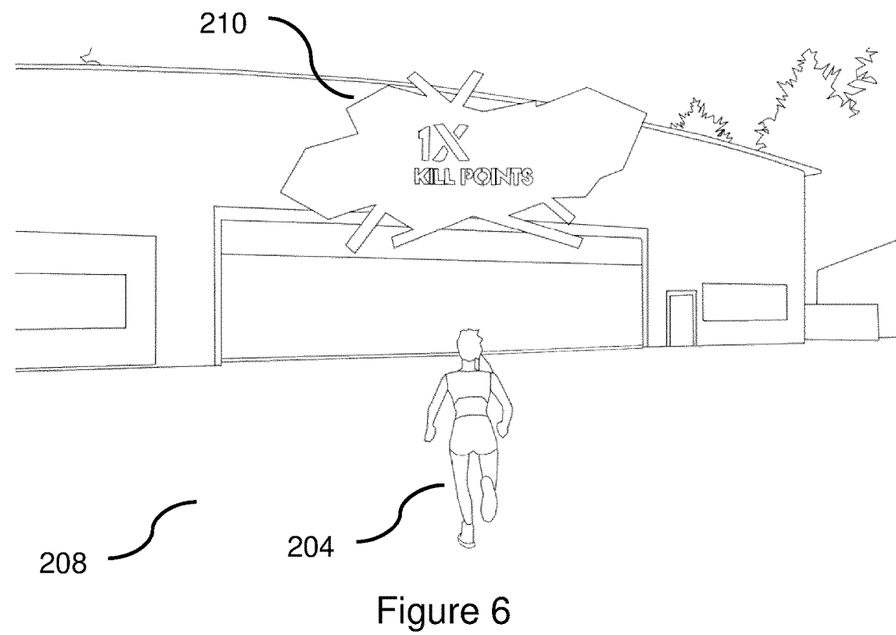
FIG. 6 is an illustration of a third screen shot representative of a computer generated environment.

At step 202 of the method 200 of FIG. 2, the processor 32 (for example, the environment circuitry) generates and provides a three dimensional environment which may also be referred to as a game word for each player of the multiplayer environment. As described above, the three dimensional environment can include interior and exterior environments. In the present embodiment, the three dimensional environment includes both exterior and interior environments. A representation of the game world may be presented to the player in the form of an on-screen map. In some embodiments, the on-screen map is configured to show modification to the game. Illustrations of screenshots showings the three dimensional computer-generated environment are shown in FIGS. 4 to 6.

At step 204, the processor 32 (for example, the character circuitry) provides a controllable character within the three dimensional environment. The scene displayed by the display apparatus 20 may include a representation of, at least part of, the character, or the scene may substantially correspond to a viewpoint of the character.

Movement of the character in the game world is achieved by a user by the user providing user input representative of an intention of the movement. The user input is received from the user via the user input device 40 and provided to processor 32. The user input is received and processed by processor 32 (for example by the input circuitry). The processor 32 (for example, character circuitry) translates said input and updates the character inside the environment in accordance with the user input, in this example, to control the character to move.

At step 206, a piece of music is selected from the music store 54 of the further computing resource to be played during the game session.

At the same time as the piece of music is selected, corresponding timing data for the piece of music is retrieved by processor 54, for example, by timing circuitry 60, from timing data store 56. As described above, the timing data is representative of time or events in the piece of music when a characteristic of the piece of music changes.

At step 208, the game session starts and the piece of music is provided to the plurality of video game apparatuses 10a, 10b, 10c, . . . 10n such that every player hears the same piece of music synchronised across the network. In the present embodiment, music data representative of the piece of music that has been selected is retrieved by processor 32 from music store 54 of shared computing resource 50 and processed by audio processing circuitry 38 and played via speakers 24.

During step 208, as the game is played, the retrieved timing data is processed at video game server 50 via processor 58 (for example, by timing circuitry). The processor 58 monitors the time elapsed of the piece of music and processes the time elapsed and the timing data to determine when the piece of music has reached a change in characteristic. Processing of the timing data and time elapsed includes comparing the time elapsed to the time that the timing data represents. When the timing circuitry determined that the piece of music has reached a pre-determined change in characteristic, the modification circuitry is notified.

In some embodiments, the timing circuitry determines that the elapsed time and value of a timing parameter coincide by performing a comparison process on the elapsed time and values. In some embodiments, a time window is defined around the value for the timing parameter such that, when the elapsed time falls into the time window it is determined that a change in a characteristic of the music has been reached. In some embodiments, the time window is defined by a pre-determined time period. In some embodiments, the time window is varied in dependence on network performance.

At step 210, the processor 58, for example, the modification circuitry, modifies one or more aspects of the game in response to the change in characteristic of the music. In the present embodiment, the modification circuitry 62 of processor 58 is notified by the timing circuitry and then performs the modification and/or instructs the modification.

As a non-limiting illustrative example, if the modification concerns a change to the environment then the modification circuitry 62 instructs processor 32, for example, the environment circuitry, to perform the modification.

Figure 3:
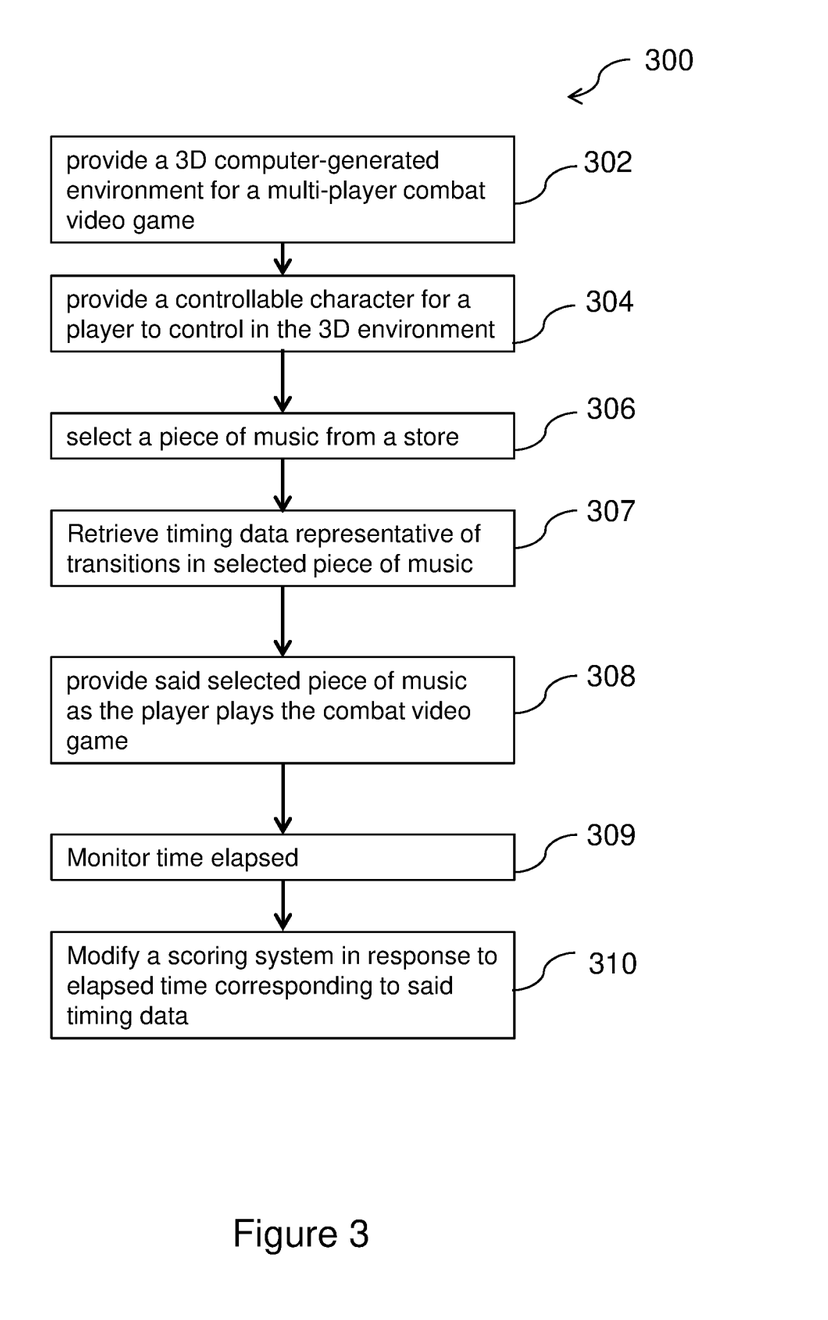
FIG. 3 is a flowchart illustrating in overview a method of an embodiment.

FIG. 3 illustrates a method of providing a 3D multi-player combat video game, in accordance with an embodiment.

Steps 302, 304 and 306 substantially correspond to steps 202, 204 and 206, respectively, as described with reference to FIG. 3.

At step 306, a piece of music is selected. The selected piece of music comprises a number of musical characteristics one of which is a song structure. In the present embodiment, the selected piece of music has song structure elements that include a verse and a chorus and transitions between verse and chorus and vice versa.

In the present embodiment, at step 308, timing data is retrieved from timing data store 56 that corresponds to the music data retrieved from music store of video game server 54. In the present embodiment, the timing data is representative of times of transitions in the music from verse to chorus. The timing data includes a first value for a timing parameter that represents the time of a transition in the music between a verse and a chorus. For example, the time of a transition is represented by a time-stamp or other suitable representation of a time. The timing data also includes a second value for the timing parameter that represents a transition in the music between the chorus and the verse. The timing data may include further values for further transitions.

At step 308, the piece of selected music is played during the game session. The piece of music is provided substantially as described with reference to step 208. At step 309, the time elapsed in the song is monitored, for example, by timing circuitry. Data representative of elapsed time is processed and a comparison to the timing data is performed to determine when the piece of music has reached a transition. The monitoring, processing and comparison steps are performed by the processor 58, for example, by timing circuitry.

At step 310, an aspect of the game session is modified in response to the piece of music reaching a transition. In the present embodiment, the aspect of the video game that is modified is the scoring system. An instruction signal is sent to each of the plurality of video game apparatuses 10a, 10b, 10c, . . . 10n instructing that the scoring system has changed. In the present embodiment, the scoring system is modified at transitions between verse and chorus such that during the chorus an increased number of points are available to players.

In the above non-limiting example, a transition between verse and chorus was provided as an example of a change in a characteristic of a piece of music. It will be understood that changes in other characteristics may be used. For example, the following non-limiting examples of changes in a characteristic of the piece of music are provided:

In some embodiments, the piece of music has a transition from a first part of the piece of music to a second part of the piece of music and the timing data corresponds to the times of such a transition and further transitions during the song. Part of the music include verse, chorus, pre-chorus, bridge, introduction, outro. For example, the transition may be between a verse and a chorus and the game modified such that combat is encouraged during the chorus.

In some embodiments, the piece of music has one or more changes in a musical characteristic, for example, tempo, pitch, loudness, musical key and the timing data is representative of such a change. As non-limiting examples, changes from quieter to louder (or slower to faster) sections of a piece of music may be accompanied by modifications that encourage combat. In some embodiments, the change in the aspect of the game is made in response to an increase in tempo or loudness to increase an excitement level.

In some embodiments, the change in the aspect of game is made in response to the certain pre-determined musical phrases in a song. For example, when a particular chord progression or a musical riff is played during the song, a modification is made.

In the above described embodiment, the aspect of the video game that was modified was a scoring system, in that the points available to players was increased and decreased during different sections of the music. It will be understood that the scoring system may be modified by providing a score multiplier in response to changes in music.

In further embodiments, in response to changes in the music, the game is modified to increase and/or decrease availability and/or the benefit of items available to players in the three dimensional computer generated environment. In further embodiments, the response to changes in music may comprise providing items at one or more pre-determined locations in the three dimensional computer generated environment.

In some embodiments, modifying one or more aspects of the multi-player combat video game includes changing the accessible area of the three dimensional environment to be smaller and/or to be restricted and/or to be limited to a particular region of the three dimensional environment. For example, a change in music prompts part of the map to be restricted. One or more structural elements may be moved, for example, doors or windows may be opened/closed. Access to certain buildings may be restricted for a given period of time. By restricting the accessible area, players are force to move to, and combat in, a smaller area.

In addition to modifying aspects directly relating to gameplay, the one or more aspects of the video game may include changing aspects that have an indirect effect on gameplay. For example, one or more visual aspects of the three dimensional computer generated environment may be varied. In some embodiments a parameter of the physics engine is modified to cause a change in the physics of the video game. In some embodiments, more than one game world is provided, and access is provided to a further game world in response to the change in music/providing access for players to a further three dimensional computer generated environment.

Other changes that may be implemented include changes to environmental conditions to impede or enhance player movement. For example, physics parameters can be changed to increase walking speed, or running speed. The effect of gravity may be modified to have an effect on jumping height. As a non-limiting example, as the tempo of the song is increased, players have the ability to run faster and cover further distance in a shorter time. Further environmental conditions may be changed, for example, to increase/decrease visibility.

In further embodiments, the three dimensional computer generated environment is a dynamic environment and an aspect of the environment is changed during the game in response to the change in music. In some embodiments, the three dimensional environment is changed from a first state to a second state, for example, through triggering of an environmental event. The event could be a weather event (for example, rain filling an area of the environment thus deeming a part of the environment inaccessible). Other non-limiting examples include, a volcano, in which rock formations are changed or an earthquake causing destructive changes and restrictions.

In the above described embodiments, changes to the game play and/or environment are considered. Further modifications can be made to the players themselves. For example, at specific times of the music, further players may be added or removed from the game. In a non-limiting example, the music has a sequence of timings such that for specific moments in the piece of music players are eliminated from the game. The removed players may be the players with the lowest score at the moment in time, for example. In some embodiments, the game includes combat between two teams, and players are mixed between the teams at the changes in the music.

In further embodiments, the location of a player's character is moved in response to the change in the music. In some embodiments, player's character's locations can be swapped. In some embodiments, players are moved so that they are closer in proximity to other players thereby to encourage combat.

In some embodiments, such modifications to the teams and/or to characters are made based on performance of the user. The performance may be from the single game session or may be aggregated performance over a number of game sessions. A handicap system may be implemented. In further embodiments, the appearance of the on-screen players are modified in response to the changes in music.

In the above described embodiment, the multi-player combat video game is played over a network of video game apparatuses connected via video game server 50.

In such circumstances, to deliver synchronised modifications to different players, in some embodiments, the processor of video game server 50 takes into account network performance, for example, one or more of network speed, network latency, network signalling delays, network lag. In some embodiments, a compensation process is performed to compensate for network performance. In some embodiments, modification circuitry instructs modifications in dependence on network performance to synchronise modifications across the plurality of video game apparatuses 10a, 10b, 10n.

In a non-limiting example, a network delay means that game data delivered to one of the plurality of computing apparatuses 10a, 10b, 10c, . . . 10n is delayed. In this example, the piece of music that is being played by said computing apparatus is not affected by the network delay, for example, because the music data has been downloaded previously and/or is being played locally and/or is being streamed from a further computing resource. In this example, a compensation process is performed to ensure that the modifications to one or more aspects to the video game are delivered to each player of the multi-player game at substantially the same time.

In the above described embodiment, the scoring system is modified at transitions of the selected piece of music such that increased points are available during the chorus and decreased points are available during the verse. The modifications are such that each time a user plays the game, the same modifications to the game are provided at the same transitions of the music. It will be understood that the correspondence between modifications of the game and changes in characteristics of music can be defined in a pre-determined set of rules.

In some embodiments, a pre-determined set of rules is provided and the aspects of the video game are modified in accordance with said set of rules associated with the piece of music. By providing a pre-determined set of rules, the same modifications are performed in response to the same changes in the at least one characteristic of the particular selected piece of music. Therefore, a user, through repeated play of the game, will become familiar with the changes in the music and the corresponding changes in aspects of the game.

The set of rules may include applying a modification to an aspect of the video game for a particular period of time, or until a further change in the same or other characteristic of the music. For example, in the above described embodiment, a modification was applied at a first transition from chorus to verse. A second modification is then applied at a second transition from verse to chorus. The second modification may reverse the first modification. For example, if the first modification is an increase in points available from an initial value to a first value the second modification is a decrease in points available from the second value to the initial value.

FIGS. 4 to 7 show illustrations of screenshots of gameplay, as displayed on display 22 of display apparatus 20. FIGS. 4 to 7 show a three dimensional computer-generated environment 202 in accordance with embodiments. FIG. 4 shows a controllable character 204 provided in accordance with embodiments. In FIG. 4 the character 204 is not moving. A view of an exterior environment that includes a building 204 is shown in FIG. 4. The building 204 may be entered by a user to reveal a view of the interior environment.

FIG. 5 shows a specific type of modification made to the game in response to a change in a characteristic of the piece of music. FIG. 4 shows an item drop, in particular, a weapon crate 208. Turning to FIG. 5, a weapon crate is shown appearing in the environment. Weapon crate 208 is shown in the environment 202 next to controllable character 204.

In some embodiments, weapon crates and other items, for example, weapon crate 208, appear at pre-determined locations of the three dimensional environment in response to changes in characteristics of the music. In some embodiments, for a particular change in a characteristic of the music, an item appears at a pre-determined location such that the player associates the change in the music with the item drop location.

Figure 7:
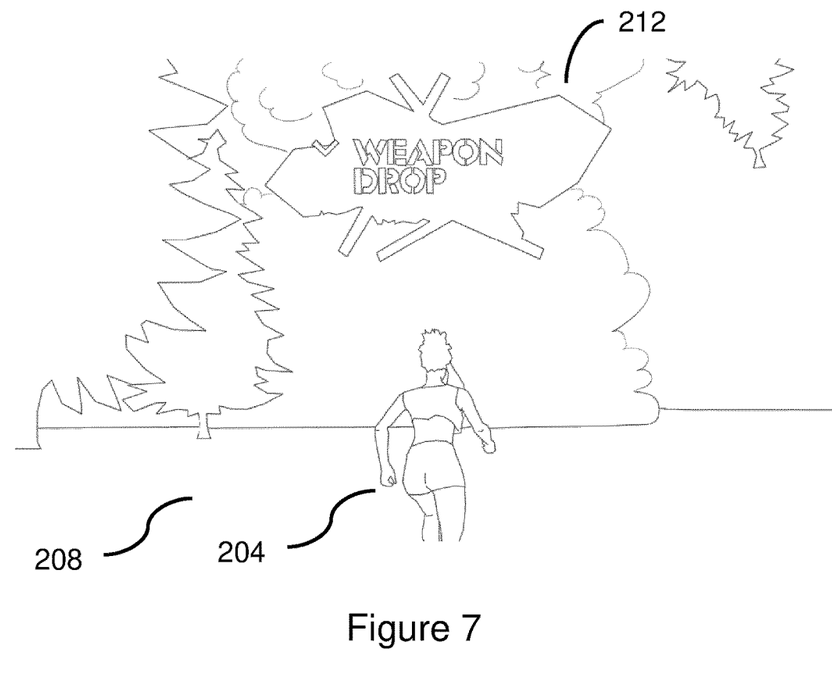
FIG. 7 is an illustration of a fourth screen shot representative of a computer generated environment.

In some embodiments, the change in one or more aspects of the game is accompanied by a display of a notification indicative of the change on display 22. As a first example, shown in FIG. 6, a first notification 210 indicative of an increase in score multiplier is displayed. As a second example, as shown in FIG. 7, a second notification 212 indicative of an item drop, in this example a weapon drop, is displayed. In further embodiments, an on-screen map of the environment is provided and visual indicators are provided on the on-screen map representing location in the environment or changes to the environment.

In the above described embodiments a selection of music is described. The selection of music may be performed automatically. The selection of a piece of music may be integrated into the game itself. Selecting the piece of music may be performed by one or more players of the combat video game.

In some embodiments, a polling or voting process is performed across the plurality of computer apparatuses 10a, 10b, 10c, . . . 10n to determine which piece of music is to be played. In some embodiments, the performance data collected during the game session, optionally historical performance also during through previous game sessions, is analysed and the player who is performing the best or has most improved is rewarded by given a choice of songs to select.

In the above described embodiments, modifications to the game correspond to changes in the music. In some embodiments, the modifications to the game may be dynamically chosen during the game in response to player performance. In some embodiments, the modifications are selectable by a player.

In some embodiments, the game can be played in a number of different three dimensional environments where each environment has a corresponding piece of music thus by selecting the environment the piece of music is also selected.

In the above described embodiments, synchronisation of providing modification in the game was discussed such that the game for all players is modified at substantially the same time. It was intended that the players all experience the same changes. However, it will be understood, that in further embodiments, the game is modified differently for different subsets of players. In particular, in response to a change in a characteristic of the piece of music, a first modification is applied to an aspect of the game for a first set of players and a second modification is applied to an aspect of the game for a second set of players. In some embodiments, the modifications are ranked such that an advantage may be given to certain players. The sub-sets of players may be different teams. In some embodiments, the modifications are graded to correspond to a player's ranking such that players who are performing less well or are less experiences are given advantages through the changes. As a non-limiting example, graded score multiplier are applied to the players such that players who have the least number of points are provided with higher score multipliers than players who have more points. Similar rankings may be applied for item drops, for example, better weapons are provided to players with fewer points or players with less health are provided with items that aid recovery.

The one or more aspects of the multi-player combat video game to be modified may be selected during the game based on at least one of: the performance of one or more players in the game session or over one or more game sessions, relative performance of players in the game session or over one or more game sessions, time elapsed.

In further embodiments, the music data and timing data are stored at different computing resources. As a non-limiting example, the timing data is stored at the video game server 50 and the music data is stored at a further computing resource (not shown). In some embodiments, the music data is stored and provided by one or more media content delivery networks. This network may comprise a distribution of servers and data centres such that media content items are retrieved or streamed from the one or more content delivery networks. Content delivery networks may also be referred to as content distribution networks. In embodiments using content delivery networks, issues regarding streaming are handled remotely by the content delivery network.

It will be understood that the present invention has been described above purely by way of example, and that modifications of detail can be made within the scope of the invention.

In the above described embodiments, processing of timing data is described as being performed centrally at the processor 58 of video game server. It will be understood that, in other embodiments, this processing step and/or other processing steps can be performed by local processors of the plurality of video game apparatuses 10a, 10b, 10n.

Each feature disclosed in the description and (where appropriate) the claims and drawings may be provided independently or in any appropriate combination.

The invention claimed is:

1. A method comprising:
providing a three dimensional computer generated environment for a multi-player combat video game;

providing a controllable character for each player of the multi-player combat video game to control in the three dimensional computer generated environment;

enabling a vote by each player of the multi-player combat video game to select one of a plurality of stored pieces of music during the multi-player combat video game, wherein each stored piece of music has pre-determined timing data representative of a time of one or more changes in at least one characteristic of each stored piece of music;

playing the selected one of the plurality of stored pieces of music in response to the vote during the multi-player game for each player of the multi-player combat video game as the players play the multi-player combat video game;

altering one or more aspects of the multi-player combat video game in response to the timing data of the selected piece of music selected during the vote during the multi-player combat video game, wherein the one or more aspects of the multi-player combat video game comprises at least one of:
a) a scoring system;
b) one or more properties or elements of the three dimensional computer generated environment thereby to change an accessible area of the three dimensional computer generated environment;
c) an environmental condition of the three dimensional computer generated environment;
d) changing a handicap associated with at least one player of the multi-player combat video game;
e) altering visibility within the multi-player combat video game; or
f) adding or removing one or more of the at least one player from the multi-player combat video game.

2. The method according to claim 1, wherein the timing data comprises one or more timing parameters, each timing parameter corresponding to the time of a change in at least one characteristic of the selected pieces of music wherein the method further comprises obtaining elapsed time data representative of an elapsed time of the provided song and processing the timing data and the elapsed time data to compare the elapsed time with the one or more timing parameters of the timing data.

3. The method according to claim 1, wherein the one or more changes in the at least one characteristic of the selected pieces of music comprises at least one of:
a) a transition from a first section of the piece of music to a second section of the selected pieces of music;
b) a change in one or more of: a tempo, a pitch, a loudness, a musical key of the pieces of music; or
c) a pre-determined chord progression, lyric, musical phrase and/or riff of the selected one of the plurality of stored pieces of music.

4. The method according to claim 1, wherein the one or more aspects of the multi-player combat video game are modified to at least one of a), b) or c):
a) encourage a behavioural response from one or more players of the multi-player combat video game;
b) encourage combat between players of the multi-player combat video game; or
c) provide a relative advantage and/or disadvantage to one or more players in the combat video game.

5. The method according to claim 1, wherein a first modification is applied to an aspect of the multi-player combat video game for a first set of one or more players of the multi-player combat video game and a second, different modification, is applied to the aspect of the multi-player combat video game or to a further aspect of the multi-player combat video game for a second set of one or more players.

6. The method according to claim 1 wherein the one or more aspects of the combat video game are modified in accordance with a pre-determined set of rules associated with the selected pieced of music.

7. The method according to claim 6, wherein the pre-determined rules comprises a pre-determined set of modifications to one or more aspects of the multi-player combat video game that correspond to one or more changes in at least one characteristic of the provided piece of music, such that, over more than one gameplay session with a particular selected piece of music, the same modifications are performed in response to the same changes in the at least one characteristic of the particular selected piece of music.

8. The method according to claim 1, wherein the modification is applied for a time period and/or until a further change in the at least one characteristic of the selected piece of music and/or until a reversal of the change in the at least one characteristic of the selected piece of music.

9. The method according to claim 1, wherein the one or more aspects of the multi-player combat video game to be modified are selected during the multi-player combat video game based on at least one of: the performance of one or more players in a game session or over one or more game sessions, relative performance of players in the game session or over one or more game sessions, time elapsed.

10. The method according to claim 1, wherein modifying the one or more aspects of the multi-player combat video game comprises at least one of:
a) increasing or decreasing points available to the players of the multi-player combat video game during gameplay;
b) providing score multipliers during gameplay;
c) increasing and/or decreasing availability and/or the benefit of items available to players of the multi-player combat video game in the three dimensional computer generated environment; or
d) providing items at one or more pre-determined locations in the three dimensional computer generated environment.

11. The method according to claim 1 wherein the modifying one or more aspects of the multi-player combat video game comprises changing the accessible area of the three dimensional computer generated environment to be smaller and/or to be restricted and/or to be limited to a particular region of the three dimensional computer generated environment.

12. The method according to claim 1, wherein modifying one or more aspects of the multi-player combat video game comprises one or more of: opening and/or closing doors, moving one or more structural elements.

13. The method according to claim 1, wherein modifying one or more aspects of the multi-player combat video game comprises changing at least one of:
a) a visual aspect of the three dimensional computer generated environment;
b) a parameter of the physics engine; or
c) providing access for players to a further three dimensional computer generated environment.

14. The method according to claim 1, wherein changing an environment condition of the three dimensional computer generated environment comprises triggering an environmental event that provides at least one change in an aspect of the three dimensional computer generated environment.

15. The method according to claim 14, wherein the environmental event comprises a weather event, a volcano, an earthquake.

16. The method according to claim 1, wherein modifying one or more aspects of the multi-player combat video game comprises at least one of:
   a) adding further players to the multi-player combat video game;
   b) removing players from the multi-player combat video game;
   c) substituting players of the multi-player combat video game;
   d) mixing players between teams of the multi-player combat video game; or
   e) swapping location of players of the multi-player combat video game.

17. The method according to claim 16, wherein the adding, removing, substituting and swapping of players is performed based upon the performance of one or more players in a game session or over one or more game sessions, relative performance of players in the game session or over one or more game sessions.

18. The method according to claim 1 wherein modifying one or more aspects of the multi-player combat video game comprises the location of one or more players to be in a pre-defined region of the three dimensional computer generated environment.

19. The method according to claim 1, wherein the multi-player combat video game is played over a network of computer resources, and the method further comprises performing a synchronisation process across the computer resources of the network such that each player experiences the one or more changes in the at least once characteristic of the provided piece of music at the substantially the same time.

20. The method according to claim 19, wherein the synchronisation process comprises compensating for one or more changes in: network speed, network latency, network signaling delays, network lag.

21. The method according to claim 1 wherein selecting the selected one of a plurality of stored pieces of music is performed by one or more players of the multi-player combat video game.

22. The method according to claim 1, wherein at least one of:
   a) the method comprises selecting the selected piece of music based on a voting process performed by players of the multi-player combat video game; and
   b) the method comprises analysing player performance and selecting the piece of music based on said analysed player performance.

23. A computer apparatus comprising a processor configured to:
   provide a three dimensional computer generated environment for a multi-player combat video game;
   provide a controllable character for each player of the multi-player combat video game to control in the three dimensional computer generated environment;
   enable a vote by each player of the multi-player combat video game to select one of a plurality of stored pieces of music stored in a memory resource during the multi-player combat video game, wherein each stored piece of music has pre-determined timing data representative of a time of one or more changes in at least one characteristic of each stored piece of music;
   play the selected one of the plurality of stored pieces of music in response to the vote during the multi-player combat video game for each player of the multi-player combat video game as the players play the multi-player combat video game;
   alter one or more aspects of the multi-player combat video game in response to the timing data of the selected pieces of music, wherein the one or more aspects of the multi-player combat video game comprises at least one of:
   a) a scoring system;
   b) one or more properties or elements of the three dimensional computer generated environment thereby to change an accessible area of the three dimensional computer generated environment;
   c) an environmental condition of the three dimensional computer generated environment;
   d) changing a handicap associated with at least one player of the multi-player combat video game;
   e) altering visibility within the multi-player combat video game; or
   f) adding or removing one or more of the at least one player from the multi-player combat video game.

24. A computer program product comprising computer readable instructions that are executable by a processor to perform a method comprising:
   providing a three dimensional computer generated environment for a multi-player combat video game;
   providing a controllable character for each player of the multi-player combat video game to control in the three dimensional computer generated environment;
   enabling a vote by each player of the multi-player combat video game to select one of a plurality of stored pieces of music during the multi-player combat video game, wherein each stored piece of music has pre-determined timing data representative of a time of one or more changes in at least one characteristic of each stored piece of music;
   playing the selected one of the plurality of stored pieces of music in response to the vote during the multiplayer combat video game for each player of the multi-player combat video game as the players play the multi-player combat video game;
   altering one or more aspects of the multi-player combat video game in response to the timing data of the selected piece of music, wherein the one or more aspects of the multi-player combat video game comprises at least one of:
   a) a scoring system;
   b) one or more properties or elements of the three dimensional computer generated environment thereby to change an accessible area of the three dimensional computer generated environment;
   c) an environmental condition of the three dimensional computer generated environment;
   d) changing a handicap associated with at least one player of the multi-player combat video game;
   e) altering visibility within the multi-player combat video game; or
   f) adding or removing one or more of the at least one player from the multi-player combat video game.

* * * * *